United States Patent [19]
Bingham et al.

[11] 3,890,286
[45] June 17, 1975

[54] PRODUCTION OF POLYCAPROAMIDE FIBER

[75] Inventors: Alex John Bingham, Lake Hiawatha, N.J.; John Christopher Haylock; Robert Alden Lofquist, both of Richmond, Va.

[73] Assignee: Allied Chemical Corporation, New York, N.Y.

[22] Filed: Dec. 20, 1973

[21] Appl. No.: 426,775

[52] U.S. Cl........... 260/78 L; 260/78 S; 260/78 SC; 260/857 R; 264/210 F
[51] Int. Cl............................................. C08g 20/14
[58] Field of Search............ 260/78 L, 857 R, 78 S, 260/78 SC

[56] References Cited
UNITED STATES PATENTS
3,719,641    3/1973    Campbell et al................. 260/78 L Primary Examiner—Lucille M. Phynes
Attorney, Agent, or Firm—Fred L. Kelly

[57] ABSTRACT

It has been suggested that a high strength polycaproamide fiber having excess number of carboxyl end groups over amino end groups can be produced by melt spinning a polymer prepared by polymerizing e-caprolactam and reacting the polymer with a dibasic carboxylic acid containing at least six carbon atoms. However, with incorporation of this dicarboxylic acid reactant in continuous operation, serious problems have been encountered in melt-spinning of the polymer due to the frequent occurrence of "nubs" or enlarged places in the extruded polyamide filament. It has now been found that the occurrence of said nubs in the fiber can be greatly reduced by utilizing certain polyanhydrides of dicarboxylic acid and reacting the polyanhydride at the end of the polymerization. Moreover, dyeing properties of the fiber may be more readily controlled.

10 Claims, No Drawings

PRODUCTION OF POLYCAPROAMIDE FIBER

BACKGROUND OF THE INVENTION

This invention relates to a process for the melt-spinning of a filamentary structure from a synthetic polyamide polymer. More particularly, it is concerned with a continuous process for the formation of high strength polycaproamide filament, yarn or the like by melt-spinning a synthetic linear fiber-forming polycaproamide having excess number of carboxyl end groups over amino end groups.

U.S. Pat. No. 2,174,527 discloses that dibasic dicarboxylic acids when employed in excess in a diacid-diamine polyamide, serve to terminate the polymer, thereby minimizing further increase in polymer molecular weight.

U.S. Pat. No. 2,241,321 teaches polymerization of caprolactam in the presence of a diamine, followed by addition of sebacic acid and completion of the polymerization. The sebacic acid apparently acts as a chain-extending agent.

More recently, U.S. Pat. No. 3,386,967 discloses that a high strength polycaproamide yarn having an excess number of carboxyl end groups over amino end groups may be produced from a high molecular weight polymer prepared by polymerizing e-caprolactam and reacting the polymer with a dibasic carboxylic acid containing at least six carbon atoms. Because polycondensation of the polymer in the presence of a dibasic carboxylic acid is relatively slow, the acid is desirably included at the start of the polymerization reaction. Even so, equilibrium is approached in the polymerization reaction mixture at number average molecular weight not above about 20,000 under usual polymerization conditions, and special measures are required to carry the reaction further. One particularly useful method of accomplishing the required further reaction is to remove volatile by-products of the polymerization such as water by flowing an inert gas across the reaction mixture surface, desirably followed by application of vacuum.

Although the process of U.S. Pat. No. 3,386,967 constitutes a major contribution to this art, we have found that in continuous operation of the process on a commercial basis, particularly at maximum production rates, serious problems have been encountered in melt spinning due to the frequent occurrence of nubs in the fiber. The term nubs is conventionally applied and is used herein to mean enlarged sections of filament no more than several filament diameters in length. Nubs may be formed by a foreign, nonorientable substance which interferes with normal fiber stretch in a short section, resulting in an enlargement. Foreign substances which are believed to have contributed to nubs in the present instance include carbonized polymer and gels formed in the polymer. Gels appear to be the chief cause, i.e., the nubs are probably created by nonorientable gel from cross-linked polymer. Thermal degradation of the polymer may be an important causative factor.

The reactions in thermal degradation of polyamides containing dicarboxylic acid additives are not entirely understood. It is likely that thermal degradation produces a decomposition product which serves to form cross-links between amide groups and adjacent polymer chains. The decomposition reaction proceeds slowly, finally building up a three-dimensional network of molecules which may be called polymer gel and which eventually reaches the stage where it forms an infusible coating on the walls of the equipment.

A serious difficulty which arises from the formation of this polymer gel on the interior walls is that from time to time pieces break off and get into the flowing polymer stream where they produce damage to the spinning equipment.

The greatest difficulty, however, is caused by polymer gel which has progressed to the threedimensional structural stage, but which has not yet reached the stage of being infusible. This kind of polymer gel is readily carried with the stream of flowing polymer. Being still molten or at least softened, it passes through the pump and even through the filter medium to show up either as discontinuities or as viscosity differences in the spun filament. When these filaments are later drawn, these defects may cause breaks in the filaments which either cause the whole thread to break or else form nubs which go through to be counted as quality defects in the final yarns.

SUMMARY OF THE INVENTION

It is an object of this invention to avoid the above difficulties by minimizing gel formations in the molten polyamide. Another object is to avoid accumulation of polymer gel on the walls of the reactor, in the pump, or in the filtering medium when melt-spinning the polyamide. A further object is to improve the uniformity and quality of filaments or fibers formed from the molten polymer; in particular to minimize nub formation in the filaments. Other objects will become apparent from the disclosure and the appended claims.

These objects are accomplished by the present invention which provides an improvement in the process for the formation of e-polycaproamide fiber from a fiber-forming e-polycaproamide polymer having excess number of carboxyl end groups over amino end groups, involving extruding the molten polymer through an orifice into a quenching medium and thereafter stretching the resulting filament, the improvement comprising:

a. continuously forming a molten polymerization reaction mixture at 240°–290°C. from e-caprolactam, said polymerization preferably being initiated by water;

b. continuously smoothly stirring said reaction mixture while flowing over the surface thereof a gas capable of removing moisture from said reaction mixture, at a flow rate of at least 2 unit volumes of said gas, measured at standard temperature and pressure, per hour per each unit volume of said reaction mixture, until the total primary amino group plus carboxyl group analysis of the resulting polymer is not above 135 milliequivalents per kilogram of polymer; and then c. continuously reacting said polymer at 250°–290°C. with 0.3 to 2.0 weight percent, preferably 0.3 to 1.0 weight percent, based on the weight of the polymer, of a polyanhydride of a dicarboxylic acid, having the formula

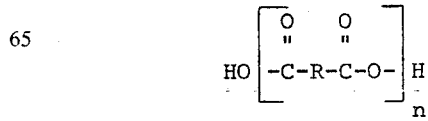

where R is a hydrocarbon radical having between 4 and 18 carbon atoms, and n is an integer between 5 and 50, until the primary amino group analysis of the polymer is not above 34 milliequivalents, preferably not above 20 milliequivalents, per kilogram of polymer and the carboxyl group analysis of the polymer is between about 50 and about 120 milliequivalents per kilogram of polymer, thereby reducing the occurrence of nubs in the fiber.

As indicated hereinabove, the present invention may be considered an improvement over the disclosure of U.S. Pat. No. 3,386,967 which is incorporated herein by reference.

The polyanhydrides employed in the present invention are known compounds, and some are commercially available. The dicarboxylic acid used in preparing the polyanhydrides can be aliphatic, alicyclic, aromatic, or alkyl-aromatic, and must contain at least 6 carbon atoms. Representative suitable species include aliphatic acids such as adipic, pimelic, suberic, azelaic, sebacic, undecanedioic and tetradecanedioic; aromatic dicarboxylic acids such as terephthalic acid, alicyclic species such as cyclohexane 1,4-dicarboxylic acid; and alkyl-aromatic species such as 4-carboxy phenyl acetic acid. The dicarboxylic acid can contain substituent groups which are non-reactive with amine or carboxyl groups in the course of the polymerization reaction. In general, the dibasic acid must be thermally stable and non-volatile under the conditions of polymerization, and will suitably contain 6–20 carbon atoms per molecule.

DESCRIPTION OF THE PREFERRED EMBODIMENT

The invention will now be further described in the following specific examples which are to be regarded solely as illustrative and not as restricting the scope of the invention. All parts and percentages are by weight unless otherwise indicated. A typical polyanhydride used in the examples may be prepared as follows:

Preparation of Polysebacic Anhydride

A solution of 20 parts sebacic acid in 100 parts acetic anhydride in a flask equipped with a reflux condenser protected by a drying tube, is refluxed for 6 hours. The solvent is removed by warming on the steam bath under water aspirator vacuum. The crude anhydride is dissolved in 200 parts of hot, dry benzene, and filtered. Dry petroleum ether is added to precipitate the polymer ($\alpha$-anhydride) which is stored over phosphorus pentoxide. This product melts at 75°–80°C. to give a viscous liquid. It has a molecular weight of about 5,000.

EXAMPLE 1

Over a period of about 12 weeks, about 100 parts per hour of e-caprolactam was continuously fed to a stirred reactor operating at a temperature of 265°C., together with steam at a pressure of about 50 p.s.i.g. to form a prepolymer melt. A trace amount of copper compound soluble in the reaction mixture was incorporated in the reaction mixture as heat stabilizer.

Polymerization was continuously accomplished in a series of three stirred reactors operated at conditions described in U.S. Pat. No. 3,109,831 to Apostle, i.e., the water and part of the unreacted lactam was continuously removed from the prepolymer melt by smoothly stirring the reaction melt at about atmospheric pressure at a temperature of about 265°C. while sweeping the surface of the smoothly stirred reaction mixture with dry nitrogen gas at a rate of about 3–4 unit volumes of gas measured at standard temperature and pressure (STP) per hour per unit volume of the reaction mixture, for approximately 4 hours. The final reactor may be operated at reduced pressure if desired.

The resulting polymer was continuously extruded into a warm water bath and chopped into pellets 1/10 by 1/10 inch in size. The pellets were then hot water washed at 100°C. to reduce the content of hot water soluble constituents to about 1–2 percent; and the pellets were dried to less than 0.1 percent moisture. The polymer was a white solid having a relative viscosity of about 55 to 60 as determined by concentration of 11 grams of polymer in 100 milliliters of 90 percent formic acid at 25°C. (ASTMD-789-62T). The total primary amino group plus carboxyl group analysis of the polymer was 104 milliequivalents per kilogram of polymer. The polycaproamide pellets were melted at 260°–285°C. and reacted for 3.5 minutes with about 0.5 weight percent of polysebacic anhydride (molecular weight 5,000) based on the weight of the polymer, then melt-extruded under a pressure of about 1500 p.s.i.g. through a 70-orifice spinnerette to produce 3900-denier fiber. The fiber was then collected and drawn about 3 times its extruded length to produce a 1300-denier yarn. For convenience, this yarn hereinafter will be called Yarn A. The polymer of Yarn A had a total primary amino group plus carboxyl group analysis of 92 milliequivalents per kilogram of polymer and a primary amino group analysis of 13 milliequivalents per kilogram of polymer.

In order to provide for comparative testing of polycaproamide made with a dicarboxylic acid additive, Yarn B having about the same total primary amino group plus carboxyl group analysis and primary amino group analysis per kilogram of polymer as Yarn A was prepared by the general procedure of this example except that sebacic acid at a concentration of 0.5 weight percent of the lactam in the polymerization reaction mixture was fed to the prepolymer reactor with the e-caprolactam. Yarn A and Yarn B both showed a good tensile strength of about 9.5 grams per denier. Yarn A and Yarn B were also tested for the number of nubs per pound as shown in Example 2.

EXAMPLE 2

This example outlines the method used for locating, identifying and calculating the nubs per pound in Yarn A and Yarn B as prepared in Example 1. In this method a nub is defined as an enlarged place in a filament which is no more than several filament diameters in length. This method may be used for either monofilament or multifilament yarns; however, it is not applicable to most types of crimped yarn.

In accordance with the test, the 1300-denier yarn is drawn directly from the package by means of an air aspirator and is passed through an opening of known width, specifically, 0.006 inch in width. Such an opening is conveniently provided by use of a ceramic cleaner gap, which is well-known in the art. The presence of a nub is detected when it stops the yarn passage through the opening. The filaments are separated and the cause of the yarn stopping identified as a nub or as the twisted end of a broken filament. For representative results, about 10 pounds of yarn is passed through the gap and the number of nubs counted. Table I below shows the results of testing on Yarn A and Yarn B.

Table I

Determination of Nubs per Pound

| Sample | Average Nub Count per Pound of Yarn |
|---|---|
| Yarn A | 3.4 |
| Yarn B | 14.3 |

The individual standard deviation in this test was 1.79 nubs per pound of yarn, so that the standard deviation of the average for the 10-pound sample was about 0.565 nubs per pound. Accordingly, the difference between the two averages, i.e., 10.9 nubs per pound, was statistically significant at the 99.9 percent level of significance.

EXAMPLE 3

A yarn was produced according to the procedure of Example 1 except that the polymerization reaction was initiated with 5 parts of aminocaproic acid instead of steam and 0.5 weight percent of polysebacic anhydride having a molecular weight of about 20,000 was used. The polymer of the resulting yarn had a total primary amino group plus carboxyl group analysis of 93 milliequivalents per kilogram of polymer and a primary amino group analysis of 14 milliequivalents per kilogram of polymer. The average nub count of the yarn was 3.9 per pound of yarn.

EXAMPLE 4

A yarn was produced according to the procedure of Example 1 except that the polycaproamide pellets were melted at 260°–280°C. and reacted for 2.3 minutes with 0.9 weight percent of polyadipic anhydride having a molecular weight of about 5,000. The polymer in the resulting yarn had a total primary amino group plus carboxyl group analysis of 94 milliequivalents per kilogram of polymer and a primary amino group analysis of 15 milliequivalents per kilogram of polymer. The average nub count of the yarn was 2.7 per pound of yarn.

EXAMPLE 5

The following comparative example demonstrates that the process of the present invention produces a yarn that is highly resistant to acid dyes. This property is advantageous in multilevel dyeing wherein different yarns are incorporated into a carpet and dyed in a single dye bath.

Part A

For comparative purposes, the following yarn was prepared.

About 100 parts per hour of e-caprolactam was continuously fed to a stirred reactor operating at a temperature of about 260°C., together with steam at a pressure of about 50 p.s.i.g. to form a polymer melt. Sufficient manganese chloride and hypophosphorous acid was added to give a manganese concentration of about 5–10 parts per million, and a phosphorous concentration of about 20–25 parts per million.

Polymerization was continuously accomplished in a series of three stirred reactors operated at conditions similar to those described in U.S. Pat. No. 3,109,831 to Apostle, that is, the water and part of the unreacted lactam was continuously removed from the melt of low molecular weight polymer by stirring the melt at about atmospheric pressure at a temperature of about 260°C. while sweeping the polymer surface with dry nitrogen at a rate of about 3 volumes of gas (STP) per volume of polymer melt for about 3 hours.

The resulting polymer was continuously extruded into a quench trough and chopped into cylindrical pellets 1/10 inch long by 1/10 inch diameter. The pellets were then washed at about 100°C. to reduce hot water solubles to about 2 percent. The pellets were then dried to less than 0.1 percent moisture. The polymer was a white solid having a relative viscosity of about 55 as determined by the ASTM-789-62T test. The amine and carboxyl analyses each showed about 50 milliequivalents per kilogram of polymer. The polymer pellets were fed to an extruder and extruded at a pressure of about 1500 p.s.i.g. through a 70-hole spinnerette. The fiber was collected and drawn about three times its extruded length to produce a 1074 denier yarn. The analysis of the yarn showed a formic acid viscosity of 54.5, with 55 milliequivalents of carboxyl groups and 44 milliequivalents of amine groups per kilogram of polymer. The hot water extractables were 1.9 percent.

Part B

A yarn was also produced in accordance with the present invention.

The polymer of Part A of this example was mixed with 0.74 parts of polysebacic anhydride (average molecular weight about 5,000) per 100 parts of polymer, for 15 minutes in an anhydrous atmosphere. The mixture was then fed to an extruder and extruded at a pressure of about 1500 p.s.i.g. through a 70-hole spinnerette to produce a fiber which was collected and drawn about three times its extruded length to produce a 1061 denier yarn. The analysis of the yarn showed a formic acid viscosity of 49, with 105 milliequivalents of carboxyl groups and 10 milliequivalents of amine groups per kilogram of polymer. The hot water extractables were 1.6 percent.

Part C

The yarns prepared in accordance with Part A and Part B of this example were then knitted into sleeves and dyed with 0.1 percent Sulfonine Acid Blue R (CI Acid Blue 82). The dyed sleeves prepared from yarn of Part B were lightly but evenly dyed with no streaks or color variation along the yarn indicating good mixing and reaction of the polyanhydride and polymer. The dye pick-up was only 2.9 percent of that picked up by the yarn of Part A.

Thus, considerable flexibility can be built into a dyeing system by reacting the polycaproamide with the polyanhydrides of the instant invention, e.g., from a single polycaproamide polymer, deep, medium and light dye polymers can be obtained using the appropriate concentrations of polyanhydride. Further flexibility of dyeing can be achieved by utilizing an amine terminated polycaproamide and reacting it with a polyanhydride in accordance with the present invention. We have found that best results are obtained using a polyanhydride having a molecular weight of at least about 5,000, preferably about 5,000 to about 20,000. Polycaproamide reacted with less than 0.3 weight percent of polyanhydride generally gave less than satisfactory basic dye receptivity, while with mixtures above 2.0 weight percent of the polyanhydride, the strength of the filaments was adversely affected. It was also found that use of a polyanhydride containing less than five dicarboxylic acid residues has an adverse effect on the product composition, this presumed due to the production of water when the acid moiety reacts with the amine groups of the polycaproamide during intimate mixing of the reactants. Use of a polyanhydride containing more than fifty dicarboxylic acid units is not considered desirable because of problems in production and handling of the polyanhydride compound.

We claim:

1. In a process for the formation of polycaproamide fiber from a fiber-forming e-polycaproamide polymer having excess number of carboxyl end groups over amino end groups, by extruding the molten polymer through an orifice into a quenching medium and thereafter stretching the resulting filament, the improvement wherein said fiber-forming e-polycaproamide polymer is prepared by a process comprising:
   a. continuously forming a molten polymerization reaction mixture at 240°–290°C. from e-caprolactam;
   b. continuously smoothly stirring said reaction mixture while flowing over the surface thereof a gas capable of removing moisture from said reaction mixture, at a flow rate of at least 2 unit volumes of said gas, measured at standard temperature and pressure, per hour per each unit volume of said reaction mixture, until the total primary amino group plus carboxyl group analysis of the resulting polymer is not above 135 milliequivalents per kilogram of polymer; and then
   c. continuously reacting said polymer at 250°–290°C. with 0.3 to 2.0 weight percent based on the weight of the polymer, of a polyanhydride of a dicarboxylic acid, having the formula

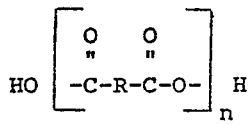

where R is a hydrocarbon radical having between 4 and 18 carbon atoms, and $n$ is an integer between 5 and 50, until the primary amino group analysis of the polymer is not above 34 milliequivalents per kilogram of polymer and the carboxyl group analysis of the polymer is between about 50 and about 120 milliequivalents per kilogram of polymer, thereby reducing the occurrence of nubs in the fiber.

2. The process in claim 1 wherein the polymerization is initiated in step (a) by water, and the proportion of polyanhydride reacted in step (c) is 0.3 to 1.0 weight percent based on the weight of the polymer.

3. The process of claim 1 wherein the reaction in step (c) is continued until the primary amino group analysis of the polymer is not above 20 milliequivalents per kilogram of polymer.

4. The process of claim 1 wherein the polyanhydride of dicarboxylic acid has a molecular weight of about 5,000 to about 20,000.

5. The process of claim 4 wherein the polymerization is initiated in step (a) by water, and the proportion of polyanhydride reacted in step (c) is 0.3 to 1.0 weight percent based on the weight of the polymer.

6. The process of claim 4 wherein the reaction in step (c) is continued until the primary amino group analysis of the polymer is not above 20 milliequivalents per kilogram of polymer.

7. The process of claim 4 wherein the polyanhydride is polysebacic anhydride.

8. The process of claim 4 wherein the polyanhydride is polyadipic anhydride.

9. In a process for the formation of polycaproamide fiber from a fiber-forming e-polycaproamide polymer having excess number of carboxyl end groups over amino end groups, by extruding the molten polymer through an orifice into a quenching medium and thereafter stretching the resulting filament, the improvement wherein said fiber-forming e-polycaproamide polymer is prepared by a process comprising:
   a. continuously forming a molten polymerization reaction mixture at 240°–290°C. from e-caprolactam;
   b. continuously smoothly stirring said reaction mixture while flowing over the surface thereof a gas capable of removing moisture from said reaction mixture, at a flow rate of at least 2 unit volumes of said gas, measured at standard temperature and pressure, per hour per each unit volume of said reaction mixture, until the total primary amino group plus carboxyl group analysis of the resulting polymer is not above 135 milliequivalents per kilogram of polymer; and then
   c. continuously reacting said polymer at 250°–290°C. with 0.3 to 1.0 weight percent, based on the weight of the polymer, of polysebacic anhydride having a molecular weight of about 5,000 to about 20,000, until the primary amino group analysis is not above 20 milliequivalents per kilogram of polymer and the carboxyl group analysis of the polymer is between about 50 and about 120 milliequivalents per kilogram of polymer, thereby reducing the occurrence of nubs in the fiber.

10. The process of claim 9 wherein the polysebacic anhydride has a molecular weight of about 5,000.

* * * * *